Aug. 30, 1927.　　W. H. RABELL　　1,640,805

COLLAR

Filed Oct. 25, 1924

INVENTOR
William H. Rabell
BY
ATTORNEY

Patented Aug. 30, 1927.

1,640,805

UNITED STATES PATENT OFFICE.

WILLIAM H. RABELL, OF PELHAM MANOR, NEW YORK.

COLLAR.

Application filed October 25, 1924. Serial No. 745,762.

The present invention relates to collars of the type commonly accepted for masculine wear, and to a method of making such collars.

At the present time the so-called semi-soft collar is in considerable favor. Some of the advantages of the semi-soft collar are that it combines the comfort of the soft collar with the neatness of appearance of the starched linen collar. The semi-soft collars which have met with favor in the trade are made of a special fabric of such properties that the collar will maintain its shape under the conditions of wear and will not wrinkle to any substantial extent.

It is a principal object of this invention to provide a semi-soft collar which does not necessitate the employment of a specially woven fabric. The invention contemplates a collar which is pliable and consequently comfortable to wear and which possesses such qualities that the collar will retain its shape and will resist wrinkling to a marked degree. To this end the collar is formed from a composite material made up in such fashion that the material presents the requisite external appearance for use in the manufacture of collars and at the same time is possessed of the requisite qualities to constitute a soft, pliable non-wrinkling collar. The outer layer of the material, which constitutes the outer surface of the collar, is a fabric and may be any desired type of fabric suitable to constitute the outer face of the collar. Behind the outer fabric layer is a layer or sheet of soft rubber. This rubber portion of the composite collar material lends a certain firmness to the material and at the same time renders it elastic so that although the material is rolled, bent or wrinkled, it will immediately return to its initial condition as soon as it is permitted to do so and will therefore not crease or wrinkle during wear. The application of the rubber layer to the outer fabric leaves the material soft and pliable. If desired, the rubber layer may be backed with another layer of fabric for the purpose of giving to the material the requisite body and weight. In the manufacture of collars the composite material built up in this fashion is cut and sewed according to the ordinary methods of collar manufacture.

It is a further object of the invention to provide a collar of the class described which is moisture proof and which consequently will not wilt under the effect of perspiration, or the like.

It is also an object of the invention to provide a soft non-wrinkling collar of the class described wherein the fold line of the collar is rendered permanent by vulcanizing the rubber layer along the fold line. The collar may be washed by means of the ordinary laundering processes ordinarily employed and, due to the elasticity and non-wrinkling character of the material and the permanency of the fold line, no ironing of the collar is necessary.

The invention is illustrated in the accompanying drawings. In said drawings.

Figure 1:
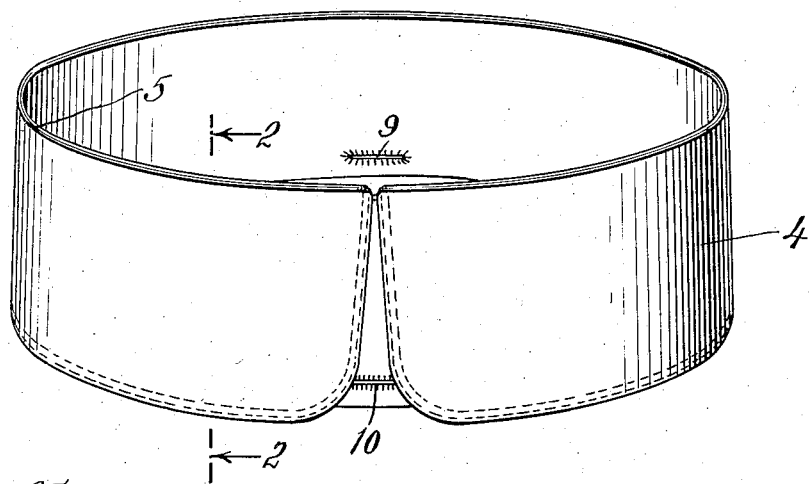
Figure 1 is a view illustrating a collar embodying the invention.

Referring to the drawings, 1 indicates the outer layer of the collar material which layer is to constitute the outer or visible face of the finished collar. This layer is of fabric and is preferably a light weight closely woven fabric which will present the desired appearance when made up into a collar. For instance, a light weight fabric having a weave of seventy-five threads to the inch is appropriate for this purpose. The only requirement is that the fabric be of suitable character and appearance to constitute the outer face of the finished collar. The ability of the collar to retain its form and to resist wrinkling is in no sense dependent upon the character of this fabric layer 1. In fact a light weight fabric is preferred and if this fabric were used alone in the manufacture of a collar it would be entirely too flimsy to retain its shape under wear and would wrinkle easily.

Figure 2:
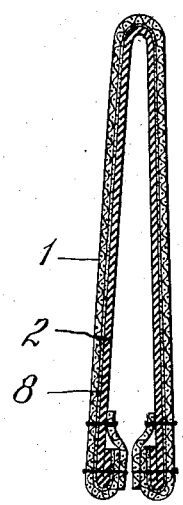
Figure 2 is a transverse sectional view taken through the collar of Figure 1 on line 2—2 thereof.
Figure 3:
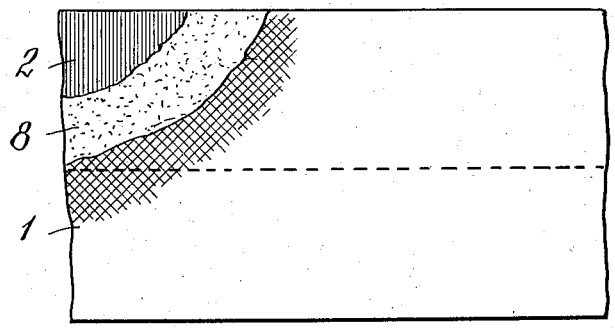
Figure 3 is a view illustrating the character of the composite material employed in the collar.
Figure 4:
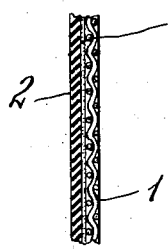
Figure 4 is a sectional view showing the character of the material.

Adjacent the outer fabric layer 1 is a thin layer or sheet 2 of soft rubber which may be applied to the fabric 1 when in plastic condition by the common methods available for such purposes and vulcanized after it is applied. If desired, however, the rubber layer 2 may consist of a thin sheet of rubber secured to the fabric 1 by means of a suitable cement 8, as best shown in Figs. 2 and 4. This rubber layer 2 need not be of any substantial thickness and is preferably merely a thin film of rubber lying directly upon the inner face of the fabric 1. From the standpoint of appearance it is preferable that the color of the rubber film be white. It is this soft pliable rubber backing which gives to the material its non-wrinkling qualities. The material may be folded, creased or wrinkled to any extent, but immediately upon release the rubber of the material will spring back into its initial form and will thus remove from the material all traces of wrinkling.

Figure 5:
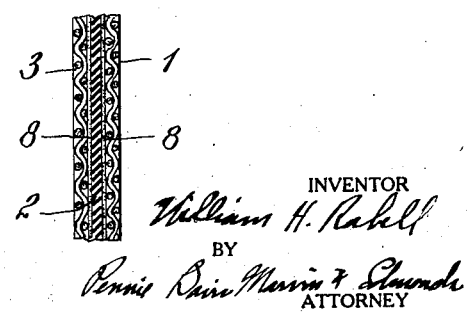
Figure 5 is a similar view showing a somewhat modified form of material.

A fabric backing 3 as shown in Fig. 5, may be provided to enclose the rubber film 2. This fabric is applied directly to the rubber film and may be of such nature that the completed composite material will be of the desired thickness and weight. A fabric somewhat heavier than the fabric 1 is preferable. For instance, a fabric having a mesh of 40 threads to the inch has been found to be suitable for the purpose. Buttonholes 9 and 10 may be provided in the usual locations, as shown in the drawings.

After the composite material is made up, the collar blanks are cut from it and the collar is manufactured according to the usual collar manufacturing methods. The requisite blanks are cut from the material and are then put together and sewed to constitute the completed collar as indicated at 4 in Figure 1. The finished collar is soft and pliable and has a marked degree of springiness and elasticity which effectually prevents wrinkling during wear. An important advantage of the collar is that it presents an attractive outward appearance and may be made up in different forms by reason of the fact that any desired fabric may be employed as the outer face material. This is an important advantage over the present types of semi-soft collars wherein the external appearance of the collar is strictly limited by reason of the special weave of fabric which must be employed.

In the manufacture of the collar the fold line, indicated at 5 in Fig. 1, is preferably formed by first creasing the collar and then passing it through heated calendering rolls or the like which process serves to raise the temperature of the material along the fold line sufficiently high to at least partially vulcanize the rubber layer along this line and thus form a permanent fold. In order to accomplish this it is not neccessary that the rubber film employed be of raw rubber for the reason that in a film of vulcanized rubber there is always a sufficient amount of uncombined sulfur to accomplish vulcanization along the fold line. The fact is that by subjecting the fold line of the collar to an appropriate temperature, the rubber layer at that point is changed so that a permanent fold line is obtained. The fact that the collar has a permanent fold line together with the inherent elasticity of the rubber and its imperviousness to moisture renders it possible to launder the collar repeatedly without material deterioration in quality or appearance and to accomplish the laundering process without ironing the article.

I claim:

1. A semi-soft collar, comprising an interior, upstanding neck-band, integral with a down-turning, exterior face-piece, and buttonholes for attaching said collar to the neckband of a shirt, said collar being constructed of a composite material comprising a layer of ordinary soft-collar fabric joined throughout its entire extent by a layer of cementitious material, coextensive with the entire width and length of the collar, to an interior layer of moisture-proof, nonfibrous, resilient vegetable substance, co-extensive with the entire length and breadth of the collar, said collar having a permanent fold-line, vulcanized in said layer of non-fibrous resilient vegetable substance.

2. A semi-soft collar, comprising an interior, upstanding neck-band integral with a down-turning exterior face-piece, and button holes for attaching said collar to the neck-band of a shirt, said collar being constructed of a composite material comprising a layer of ordinary soft-collar fabric joined to a layer of soft rubber, said layer being vulcanized along the upper turned-down edge of said face-piece to form a permanent fold-line.

3. The method of forming a soft non-wilting collar of the class described which comprises applying to a face fabric a layer of soft rubber, folding the material thus formed along a line corresponding to the fold line of the collar and subjecting the material along said fold line to heat sufficient to effect vulcanization of rubber along said line.

4. The method of forming a semi-soft collar of the type described, which comprises applying to a facing-layer of ordinary soft-collar fabric a layer of soft rubber, substantially as described, and forming a permanent fold-line in said layer by subjecting the fold of said collar to heat and shaping-pressure sufficient to effect a permanent set in said layer at said fold-line.

In testimony whereof I affix my signature.

WILLIAM H. RABELL.